(12) United States Patent
Asanuma

(10) Patent No.: US 11,781,849 B2
(45) Date of Patent: Oct. 10, 2023

(54) INSPECTION MASTER

(71) Applicant: ASANUMA GIKEN CO., LTD., Hamamatsu (JP)

(72) Inventor: Susumu Asanuma, Hamamatsu (JP)

(73) Assignee: ASANUMA GIKEN CO., LTD., Hamamatsu (JP)

(*) Notice: Subject to any disclaimer, the term of this patent is extended or adjusted under 35 U.S.C. 154(b) by 62 days.

(21) Appl. No.: 17/613,266

(22) PCT Filed: Jan. 24, 2020

(86) PCT No.: PCT/JP2020/002509
§ 371 (c)(1),
(2) Date: Nov. 22, 2021

(87) PCT Pub. No.: WO2020/261623
PCT Pub. Date: Dec. 30, 2020

(65) Prior Publication Data
US 2022/0221261 A1 Jul. 14, 2022

(30) Foreign Application Priority Data
Jun. 25, 2019 (JP) ................. 2019-117282

(51) Int. Cl.
*G01B 5/016* (2006.01)
*G01B 21/04* (2006.01)
*G01B 5/008* (2006.01)

(52) U.S. Cl.
CPC .............. *G01B 5/016* (2013.01); *G01B 5/008* (2013.01); *G01B 21/042* (2013.01)

(58) Field of Classification Search
CPC ....... G01B 5/016; G01B 21/042; G01B 5/008
See application file for complete search history.

(56) References Cited

U.S. PATENT DOCUMENTS 4,364,182 A * 12/1982 Jones ................. G01B 3/30
73/1.79
4,523,450 A 6/1985 Herzog
(Continued)

FOREIGN PATENT DOCUMENTS

EP  3816571 A1  5/2021
JP  S60-046579 U  4/1985
(Continued)

OTHER PUBLICATIONS

Dec. 24, 2021 Notice of Allowance issued in U.S. Appl. No. 17/055,451.
(Continued)

*Primary Examiner* — John Fitzgerald
*Assistant Examiner* — Tania Courson
(74) *Attorney, Agent, or Firm* — Oliff PLC

(57) ABSTRACT

An inspection master can perform three- and five-axis measurements wherein measurement in a rotation axis or/and turning axis direction for a five-axis processing machine is added. In one aspect, peripheral-surface spherical reference portions protrudes laterally on a peripheral surface of a master main body having a tubular shape, including the peripheral surface and an upper surface, and an upper reference ball for detection of an inclination angle of the body protrudes upward on the upper surface. The reference portions are provided at two or more portions of the peripheral surface in a circumferential direction thereof. In another aspect, an upper reference ball protrudes upward on the upper surface, and upper-surface spherical reference portions protrudes upward at one or more portions of the upper surface on an outer side with respect to the ball. In another aspect, both the peripheral-surface and upper-surface spherical reference portions are on the master main body.

7 Claims, 13 Drawing Sheets

(56) References Cited

U.S. PATENT DOCUMENTS

| | | | |
|---|---|---|---|
| 4,763,507 A * | 8/1988 | Zofchak | G01B 21/042 |
| | | | 33/502 |
| 4,819,339 A * | 4/1989 | Kunzmann | G01B 21/042 |
| | | | 33/1 S |
| 4,932,136 A | 6/1990 | Schmitz et al. | |
| 4,962,591 A | 10/1990 | Zeller et al. | |
| 5,125,261 A * | 6/1992 | Powley | G01B 3/30 |
| | | | 33/502 |
| 5,269,067 A * | 12/1993 | Waeldele | G01B 3/30 |
| | | | 73/1.79 |
| 5,313,410 A | 5/1994 | Watts | |
| 6,023,850 A | 2/2000 | Trapet | |
| 6,493,956 B1 | 12/2002 | Matsuda | |
| 6,513,253 B2 * | 2/2003 | Matsuda | G01B 3/30 |
| | | | 73/1.79 |
| 6,782,730 B2 * | 8/2004 | Asanuma | G01B 21/042 |
| | | | 73/1.79 |
| D619,481 S | 7/2010 | Asanuma | |
| 7,755,754 B2 * | 7/2010 | Spalding | G01B 21/042 |
| | | | 356/243.1 |
| 8,792,709 B2 | 7/2014 | Pulla et al. | |
| 9,952,044 B2 | 4/2018 | Gatton | |
| D827,459 S * | 9/2018 | Matsumiya | D10/63 |
| 10,166,644 B2 | 1/2019 | Kume et al. | |
| 10,697,756 B2 * | 6/2020 | Samo | G01B 5/0007 |
| 10,845,192 B2 | 11/2020 | Lause | |
| 10,888,968 B2 | 1/2021 | Toimela et al. | |
| 11,293,745 B2 * | 4/2022 | Asanuma | G01B 7/008 |
| 2002/0157449 A1 | 10/2002 | Asanuma | |
| 2005/0066534 A1 | 3/2005 | Matsuda | |
| 2009/0100901 A1 | 4/2009 | Spalding | |
| 2010/0088056 A1 | 4/2010 | Igarashi et al. | |
| 2018/0203429 A1 | 7/2018 | Wake et al. | |

FOREIGN PATENT DOCUMENTS

| | | |
|---|---|---|
| JP | S62-133106 U | 8/1987 |
| JP | 2001-311618 A | 11/2001 |
| JP | 2002-039742 A | 2/2002 |
| JP | 2002-195820 A | 7/2002 |
| JP | 2003-302202 A | 10/2003 |
| JP | 2003-329402 A | 11/2003 |
| JP | 2004-286457 A | 10/2004 |
| JP | 2006-266972 A | 10/2006 |
| JP | 2009-133790 A | 6/2009 |
| JP | 2014-098649 A | 5/2014 |
| JP | 2015-506461 A | 3/2015 |
| JP | 2016-151520 A | 8/2016 |
| JP | 6419380 B1 | 11/2018 |
| JP | 6469927 B1 | 2/2019 |
| JP | 6631984 B1 | 1/2020 |
| WO | 03/095935 A1 | 11/2003 |
| WO | 2008/105096 A1 | 9/2008 |
| WO | 2013/093397 A1 | 6/2013 |

OTHER PUBLICATIONS

Feb. 23, 2022 Search Report issued in Europeant Patent Application No. 19825956.6.
Aug. 27, 2019 International Search Report issued in International Patent Application No. PCT/JP2019/024503.
Aug. 3, 2018 Office Action issued in Japanese Patent Application No. 2018-122735.
Aug. 27, 2019 Written Opinion issued in International Patent Application No. PCT/JP2019/024503.
Jul. 30, 2019 Office Action issued in Japanese Patent Application No. 2019-117282.
Mar. 3, 2020 International Search Report issued in International Patent Application No. PCT/JP2020/002509.
Mar. 3, 2020 Written Opinion of the International Searching Authority issued in International Patent Application No. PCT/JP2020/002509.
U.S. Appl. No. 17/055,451, filed Nov. 13, 2020 in the name of Susumu Asanuma.
Jun. 21, 2023 Extended European Search Report issued in European Patent Application No. 20832253.7.

* cited by examiner

INSPECTION MASTER

TECHNICAL FIELD

The present invention relates to an inspection master capable of performing accuracy inspection for a contact type three-dimensional measuring machine and further, accuracy measurement for a five-axis processing machine.

BACKGROUND ART

Three-axis processing machines and five-axis processing machines have been used for processing machine parts such as an automobile engine and a transmission case. As an example of the five-axis processing machine, a five-axis machining center is given. The "five-axis" normally corresponds to five axes in total including three axes, specifically, a right-and-left axis (X), a front-and-rear axis (Y), and an up-and-down axis (Z) and additional other two axes, specifically, a rotation axis and a turning axis.

A contact type three-dimensional measuring machine has been used for measuring dimensions of machine parts having been subjected to three-axis machining. The contact type three-dimensional measuring machine includes a spherical probe (contact element), and the probe is brought into contact with an object to be measured, which is set on a measurement table, to enable measurement of dimensions, smoothness, and the like of the object to be measured.

In order to maintain measurement accuracy, the contact type three-dimensional measuring machine is periodically subjected to inspection of the measurement accuracy with use of an inspection master finished with high accuracy. The applicant of the subject application previously developed and proposed inspection masters (Patent Literatures 1 to 4).

In an inspection master A (FIG. 12) previously developed by the applicant of the subject application, four upper-surface measurement portions D serving as measurement references are provided on an upper surface C of a hollow cylindrical master main body B, and peripheral-surface measurement portions F are provided on a peripheral surface E and are arranged in four rows each including two peripheral-surface measurement portions F. A reference hole (vertical hole) G opened vertically is formed at the center of each of the upper-surface measurement portions D, and a reference hole (lateral hole) H opened laterally is formed at the center of each of the peripheral-surface measurement portions F.

As one of the contact type three-dimensional measuring machine, there is known a so-called "gantry type". As illustrated in FIG. 13, the contact type three-dimensional measuring machine of the gantry type includes a gantry-type movable frame J slidable in a reciprocating manner in a Y direction (front-and-rear direction), a head portion K supported by the gantry-type movable frame J and slidable in a reciprocating manner in an X direction (right-and-left direction), an elevation shaft L supported on the head portion K so as to be vertically movable in a Z direction (up-and-down direction), and a probe M at a tip of the elevation shaft L. A tip portion of the probe M is formed into a highly accurate spherical shape with a hard and abrasion-resistant material such as artificial ruby or ceramics.

When inspection of the measurement accuracy or data taking required for calibration of a measurement error is to be performed on the contact type three-dimensional measuring machine of the gantry type of FIG. 13 with use of the inspection master A of FIG. 12, as illustrated in FIG. 13, the inspection master A is set on a holder O mounted to a measurement table N of the contact type three-dimensional measuring machine of the gantry type. The probe M of the contact type three-dimensional measuring machine is brought into contact with an inner peripheral surface or a measurement reference surface I (FIG. 12) of the upper-surface measurement portion D or an inner peripheral surface or a measurement reference surface I (FIG. 12) of the peripheral-surface measurement portion F of the inspection master A to measure smoothness of the contact point and various items required for evaluation of the contact type three-dimensional measuring machine. The measured value (actual measured value) is compared with a reference value in which metric traceability is confirmed to check an error between the actual measured value and the reference value and check straightness of each axial direction in which the probe M moves, squareness between the axes, and an error in each axial direction. In this manner, the inspection for the contact type three-dimensional measurement machine itself is performed.

CITATION LIST

Patent Literature

[PTL 1] JP 2001-311618 A
[PTL 2] JP 2002-195820 A
[PTL 3] JP 6419380 B2
[PTL 4] JP 6469927 B2

SUMMARY OF INVENTION

Technical Problem

The vertical hole G of each of the upper-surface measurement portions D of the upper surface C of the inspection master A of FIG. 12 is opened perpendicularly to the upper surface C, and the lateral hole H of each of the peripheral-surface measurement portions F of the peripheral surface E is opened horizontally to the peripheral surface E. Thus, although the probe M can be inserted into the vertical hole G or the lateral hole H for measurement, or the probe M of the contact type three-dimensional measuring machine can be brought into contact with the measurement reference surface I of the upper-surface measurement portion D or the peripheral-surface measurement portion F to measure the smoothness of the reference surface I, measurement in a direction oblique to a vertical axis of the master main body B cannot be performed. Further, in recent years, five-axis processing machines having three axes of X, Y, and Z and additional two axes of rotation and turning have been used widely, but there is no inspection master suitable for performing accuracy inspection for the five-axis processing machines.

The present invention provides an inspection master capable of performing accuracy inspection or check for a five-axis processing machine and also accuracy inspection or check for the contact type three-dimensional measuring machine.

Solution to Problem

In an inspection master of the present invention, reference portions each having a spherical shape (peripheral-surface spherical reference portions) are provided at several portions in a circumferential direction of a peripheral surface of a master main body having a three-dimensional shape and including an upper surface and the peripheral surface. The peripheral-surface spherical reference portions are spherical bodies provided in such a manner as to protrude from the peripheral surface to an outer side. The peripheral-surface spherical reference portions may be provided in such a manner as to protrude right laterally from the peripheral surface to the outer side or provided in such a manner as to protrude obliquely laterally with respect to the peripheral surface. The oblique lateral angle may be freely selectable. All of the spherical bodies are provided in such a manner as to protrude laterally away from the peripheral surface of the master main body. The peripheral-surface spherical reference portions may be provided at two or more portions of the peripheral surface in the circumferential direction, and two or more spherical bodies may be provided in a row in a vertical direction at each portion.

On the peripheral surface of the master main body, peripheral-surface hole-shaped reference portions each having a laterally opened hole may be provided in addition to the peripheral-surface spherical reference portions. The peripheral-surface hole-shaped reference portions may also be provided at two or more portions of the peripheral surface in the circumferential direction, and two or more peripheral-surface hole-shaped reference portions may be provided in the vertical direction at each portion. All of the peripheral-surface hole-shaped reference portions are provided laterally in the same way.

An upper reference ball may be provided at a central portion of the upper surface of the master main body. The upper reference ball is used to check an inclination angle of the master main body to be inclined at the time of five-axis measurement. The upper reference ball is provided in such a manner as to protrude directly upward from the upper surface and perpendicularly to the upper surface. The upper reference ball is provided in such a manner as to protrude away upward from the upper surface of the master main body.

On the upper surface of the master main body, upper-surface hole-shaped reference portions may be provided in addition to the upper-surface spherical reference portions and the upper reference ball. The upper-surface hole-shaped reference portions each have a vertically opened hole. Two or more upper-surface hole-shaped reference portions may be provided on the upper surface.

Advantageous Effects of Invention

The inspection master of the present invention has following effects.

(1) Similarly to the inspection master thus far, three-axis measurement of X, Y, and Z for the contact type three-dimensional measuring machine is possible, thereby being capable of performing inspection of measurement accuracy of the contact type three-dimensional measuring machine.

(2) The peripheral-surface spherical reference portions are provided on the peripheral surface of the master main body. Thus, through measurement of a central coordinate of each of the peripheral-surface spherical reference portions with a measurement machine provided in the five-axis processing machine, thereby being capable of easily performing five-axis accuracy measurement for the five-axis processing machine. Further, the peripheral-surface spherical reference portions are spherical bodies. Thus, even when the inspection master is inclined, the central coordinate of each of the peripheral-surface spherical reference portions is easily obtained, thereby improving measurement accuracy.

(3) The upper reference ball is provided at the central portion of the upper surface of the master main body. Thus, a rotation inclination angle or a turning inclination angle of the inspection master that is rotated or/and turned can be checked based on the upper reference ball, thereby being capable of performing axis measurement in an oblique direction with high accuracy.

DESCRIPTION OF EMBODIMENTS

First Embodiment of Inspection Master

Figure 1:
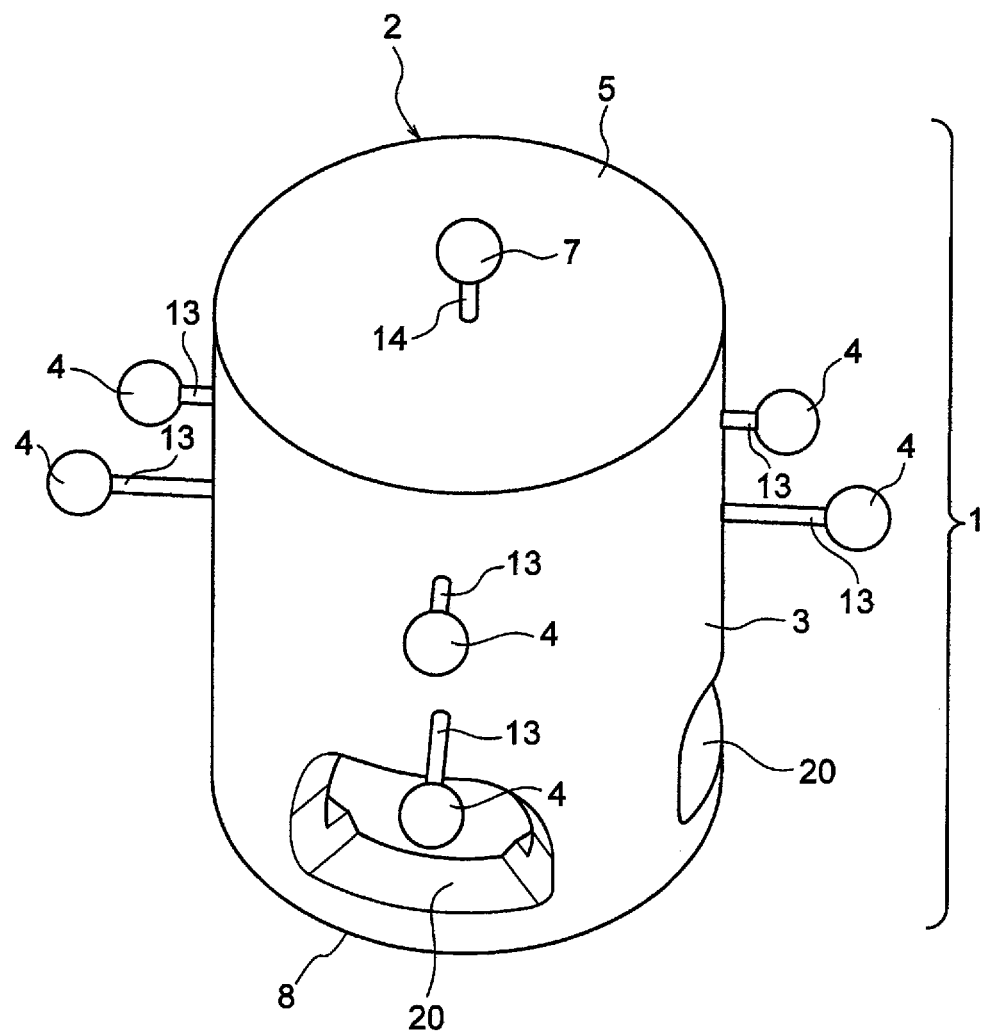
FIG. 1(a) is a perspective view of an inspection master of the present invention in which peripheral-surface spherical reference portions are provided in four rows on a peripheral surface of a master main body.
FIG. 1(b) is an explanatory view of mounting of an upper reference ball of FIG. 1(a).
Figure 1:
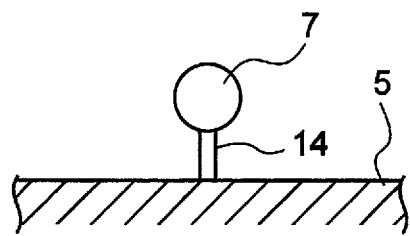
Figure 2:
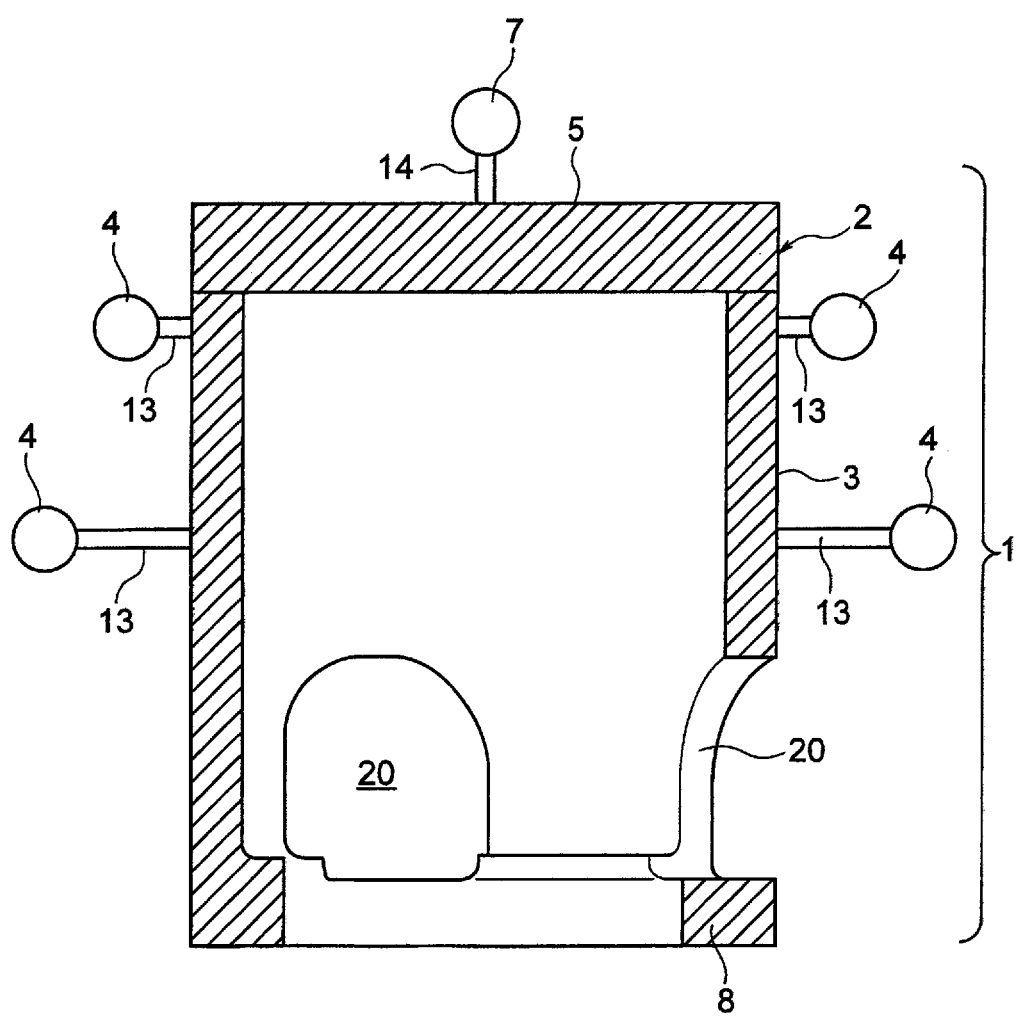
FIG. 2 is a vertical sectional view of the inspection master of FIG. 1(a).

In an inspection master 1 of FIG. 1(a) and FIG. 2, which is an example of an embodiment of an inspection master of the present invention, peripheral-surface spherical reference portions 4 are provided on a side surface (peripheral surface) 3 of a hollow cylindrical master main body 2, and an upper reference ball 7 is provided on an upper surface 5.

[Master Main Body]

As illustrated in FIG. 1(a) and FIG. 2, the master main body 2 has an opened bottom surface 8, has a hollow cylindrical shape (hollow three-dimensional shape) with a hollow inside, and has opening portions 20 at several portions of the peripheral surface 3 in a circumferential direction on the bottom surface 8 side. The bottom surface 8 may be closed by a bottom plate (not shown), and may have a stop hole (not shown) opened in the vicinity of the center of the bottom plate. The opening portions 20 are used to reduce the weight of the inspection master 1 and facilitate mounting of the inspection master 1 to a holder of a measurement machine, and the size (longitudinal and lateral dimensions) may be suitably designed. It is suitable that the master main body 2 is made of a material having small thermal expansion and excellent dimensional stability. For example, ceramics, quartz, crystal, low thermal expansion cast iron, and SK steel are suitable. The master main body 2 may be formed by machining from a single lump (block) of those materials, or may be formed by bonding plate materials made of those materials. The master main body 2 is not necessarily required to be hollow as long as the master main body 2 is made of a material that is small in weight, small in thermal expansion, and excellent in dimensional stability, and may be solid wood. Those configurations of the master main body 2 are the same in master main bodies in the following embodiments.

[Peripheral-Surface Spherical Reference Portions]

The peripheral-surface spherical reference portions 4 are spherical bodies provided in such a manner as to protrude from the peripheral surface 3 right laterally to the outer side. The spherical bodies are provided on the peripheral surface 3 in four rows at equal intervals, and are provided in two upper and lower stages (two) in each row. The number of the spherical bodies in each row may be one or three or more. In any case, the spherical body is mounted to the peripheral surface 3 through intermediation of a connecting shaft 13 and is away from the peripheral surface 3. In the two spherical bodies in each row, the spherical body in the lower stage (on the bottom surface side of the master main body 2) is provided in such a manner as to protrude laterally longer than the spherical body in the upper stage (on the upper surface 5 side of the master main body 2). Also in a case of providing three or more spherical bodies, the spherical body in the lower stage is provided in such a manner as to protrude laterally longer than the spherical body in the upper stage. The four rows of peripheral-surface spherical reference portions 4 are provided at equal intervals of 90° in the circumferential direction of the peripheral surface 3, but the intervals may be intervals other than 90°, and are not required to be equal intervals. A diameter and a protruding length (length of a connecting shaft 13) of the spherical body are designed such that accuracy measurement for a five-axis processing machine can easily be performed. The material to be used is less liable to be chipped and cracked and is less liable to be expanded, contracted, and deformed by temperature. The spherical bodies of the peripheral-surface spherical reference portions 4 are provided in such a manner as to protrude right laterally, but may protrude obliquely laterally if possible. In this case, the obliquely lateral angle may be suitably designed. The spherical bodies of the peripheral-surface spherical reference portions 4 have a large vertical interval, and when the spherical body in the upper stage does not become an obstacle at the time of measurement of the spherical body in the lower stage, the protruding length of the spherical body in the upper stage may be longer than or equal to the protruding length of the spherical body in the lower stage. Those configurations of the peripheral-surface spherical reference portions 4 are the same in peripheral-surface spherical reference portions in the following embodiments.

[Upper Reference Ball]

The upper reference ball 7 is a spherical body provided in such a manner as to protrude at a central portion of the upper surface 5 of the master main body 2. The spherical body is provided in such a manner as to protrude perpendicularly to and directly upward from the upper surface 5 through intermediation of a connecting shaft 14, and is mounted through intermediation of the connecting shaft 14 and is away from the upper surface 5. Also a diameter and a protruding length (length of the connecting shaft 14) of this spherical body are designed such that measurement can easily be performed. A material to be used is less liable to be chipped and cracked and is less liable to be expanded, contracted, and deformed by temperature. The upper reference ball 7 is used to check an inclination angle of the master main body 2 that is inclined at the time of accuracy measurement for the five-axis processing machine. The inclination angle of the master main body 2 that is inclined at the time of five-axis measurement is obtained from, for example, a difference between a central coordinate of the upper reference ball 7 when the master main body 2 is inclined and a central coordinate of the upper reference ball 7 when the master main body 2 is vertical. The upper reference ball 7 may be provided at a portion other than the center of the upper surface 5 if possible. Those configurations of the upper reference ball 7 are the same in upper reference balls in the following embodiments.

Second Embodiment of Inspection Master

Figure 3:
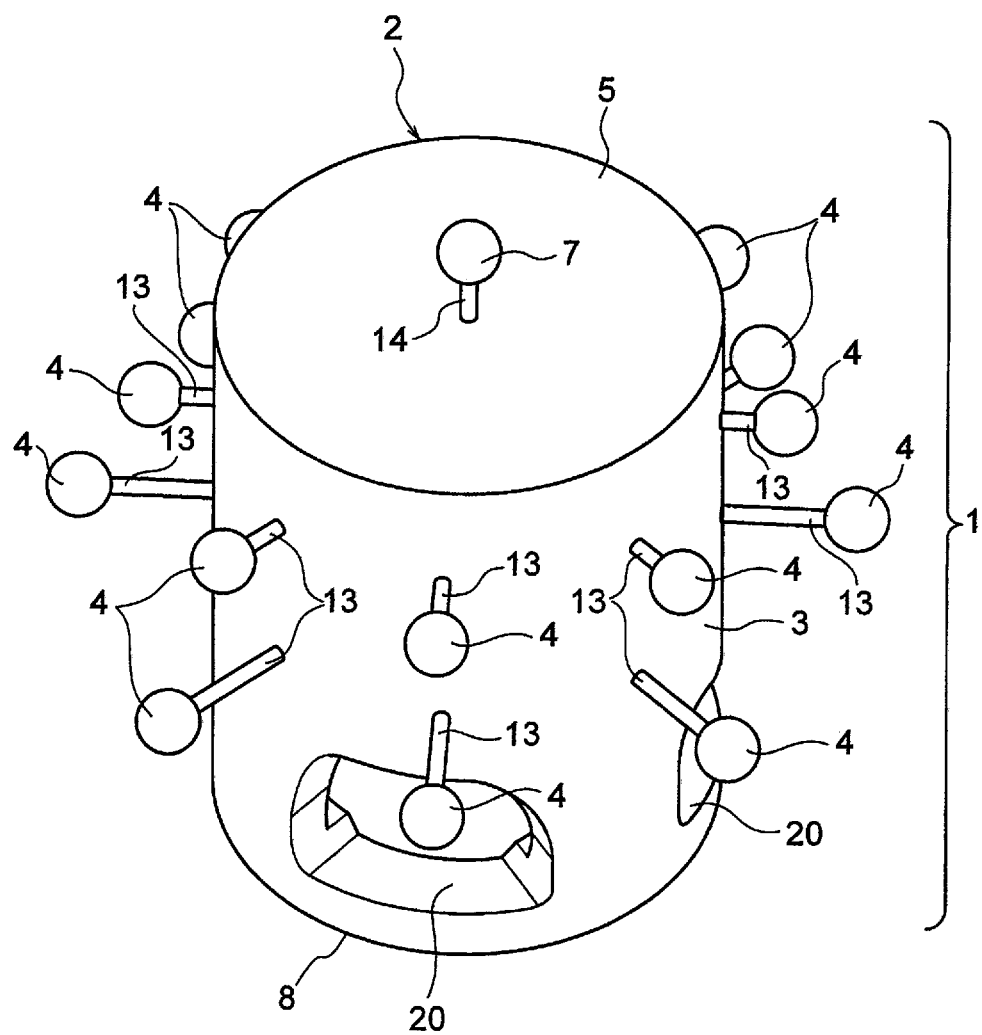
FIG. 3 is a perspective view of an inspection master of the present invention in which the peripheral-surface spherical reference portions are provided in eight rows on the peripheral surface of the master main body.

An inspection master 1 of FIG. 3 is basically the same as the inspection master 1 of FIG. 1(a), and is different in that the peripheral-surface spherical reference portions 4 are provided in eight rows at equal intervals in a circumferential direction of the peripheral surface.

Third Embodiment of Inspection Master

Figure 4:
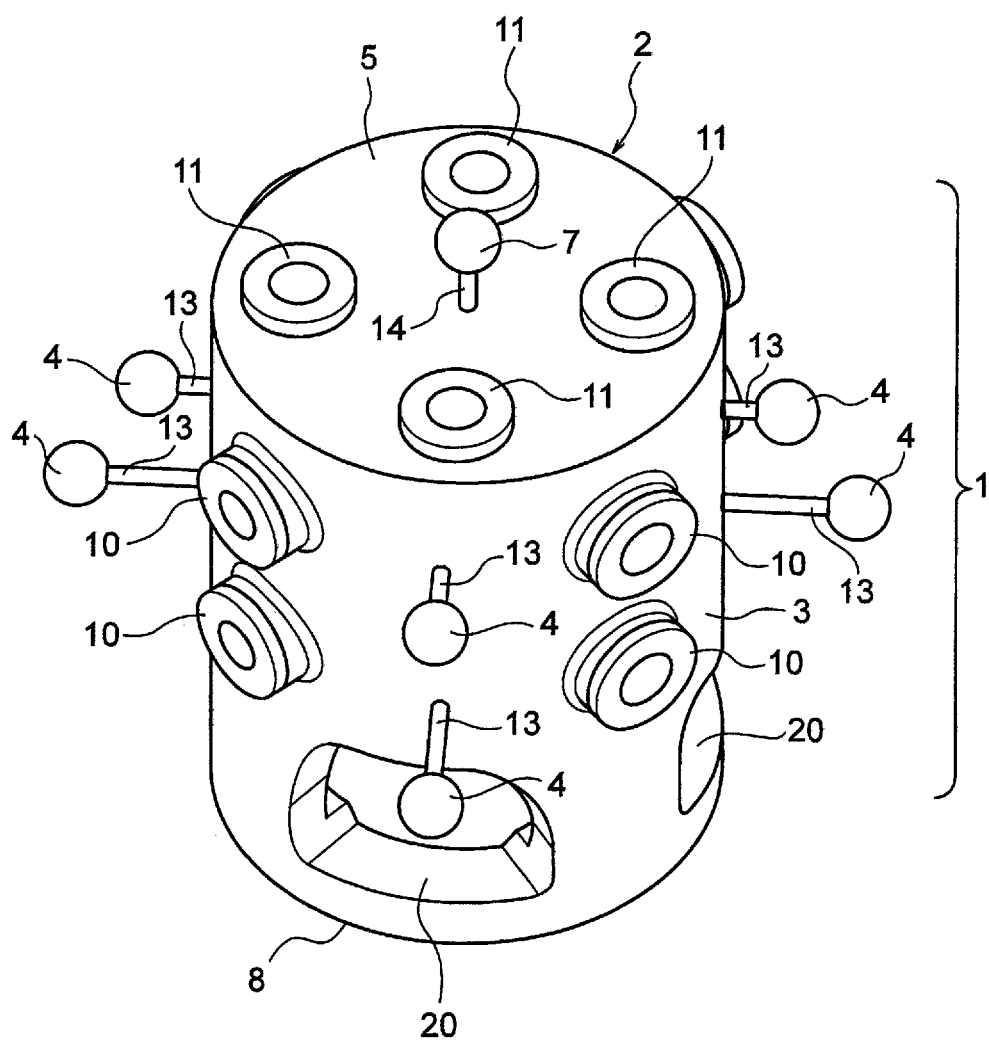
FIG. 4 is a perspective view of an inspection master of the present invention when the peripheral-surface spherical reference portions and peripheral-surface hole-shaped reference portions are provided on the peripheral surface, and upper-surface hole-shaped reference portions are provided on the upper surface.
Figure 5:
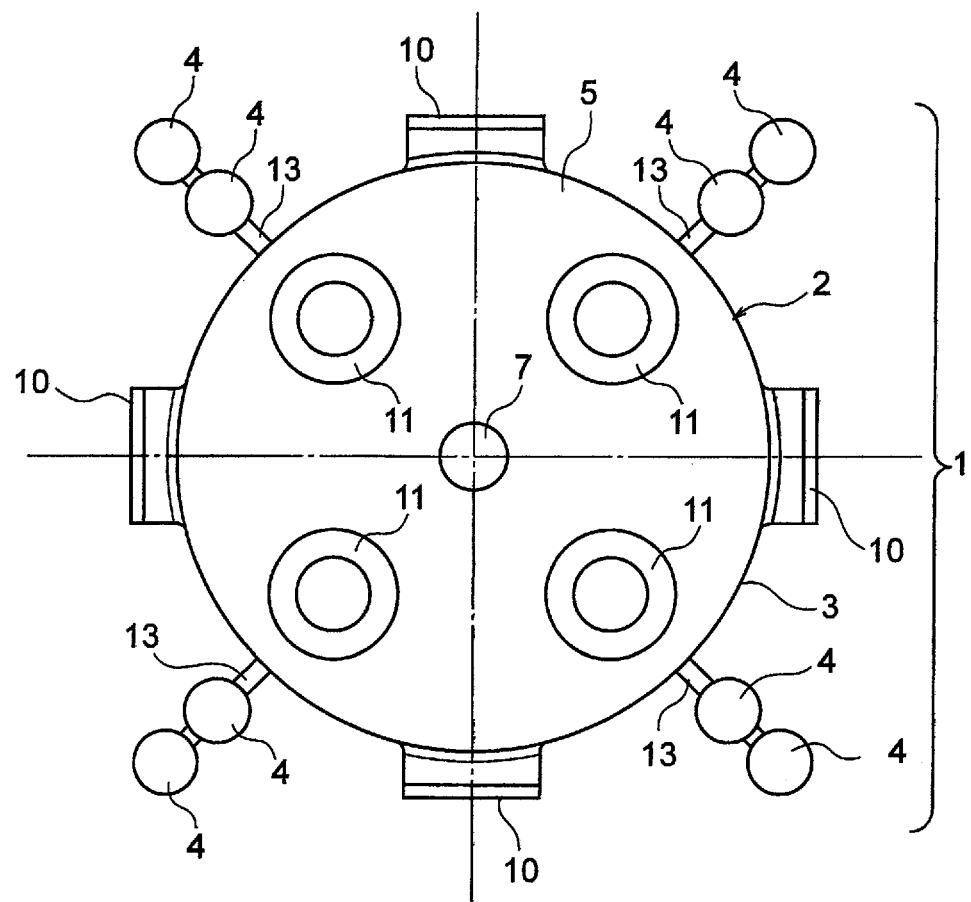
FIG. 5 is a plan view of the inspection master of FIG. 4.

An inspection master 1 of FIG. 4 and FIG. 5 is basically the same as the inspection master 1 of FIG. 1(a), and is different in that peripheral-surface hole-shaped reference portions 10 are provided between the peripheral-surface spherical reference portions 4 at four portions in the circumferential direction of the peripheral surface 3 of the master main body 2, and upper-surface hole-shaped reference portions 11 are provided on the upper surface 5. The portions of the openings and the numbers of the peripheral-surface hole-shaped reference portions 10 and the upper-surface hole-shaped reference portions 11 can also be suitably designed.

[Peripheral-Surface Hole-Shaped Reference Portions]

Figure 9:
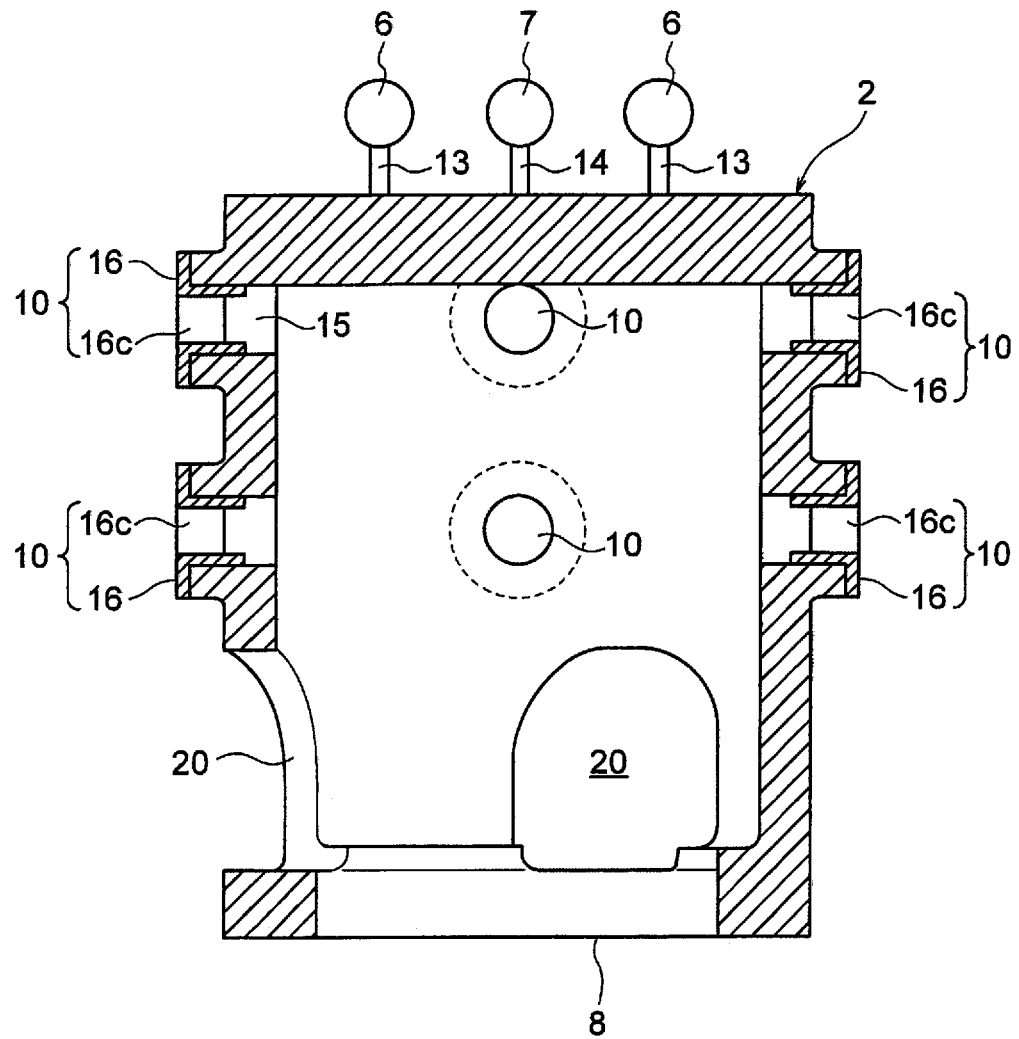
FIG. 9(a) is a vertical sectional view of the inspection master of FIG. 8.
FIG. 9(b) is an explanatory view of a vertical cross section of a mounting hole of the peripheral-surface hole-shaped reference portion of FIG. 9(a) and a flanged bush.
FIG. 9(c) is a vertical sectional view of a state in which the flanged bush is mounted to the mounting hole of FIG. 9(b).
Figure 9:
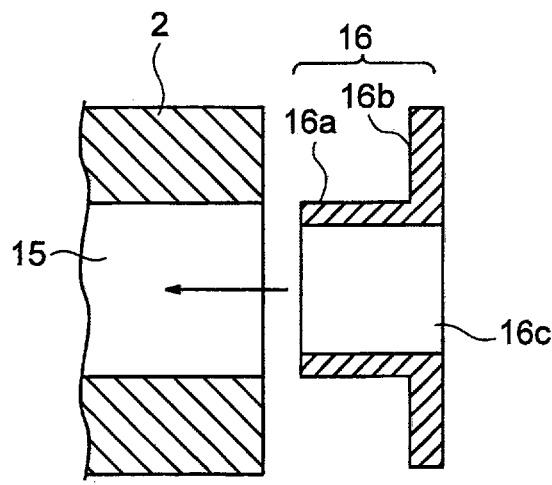
Figure 9:
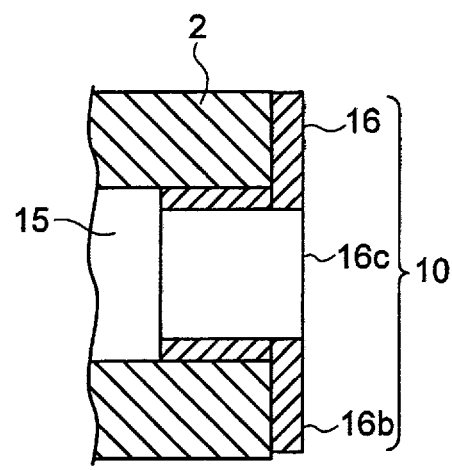

The peripheral-surface hole-shaped reference portions 10 (FIG. 4 and FIG. 5) are provided in four rows at equal intervals of 90° in the circumferential direction of the peripheral surface 3, and are provided in two upper and lower stages in each row. In each of those peripheral-surface hole-shaped reference portions 10, as illustrated in FIG. 9(*c*), a flanged bush 16 of FIG. 9(*b*) is inserted into and fixed to a laterally opened hole 15, which is opened right laterally to the peripheral surface 3 of the master main body 2 as illustrated in FIG. 9(*b*). The flanged bush 16 has a circular flange 16*b* having a hole at a distal end of a cylindrical portion 16*a*. An inner peripheral surface of a through hole 16*c* of the flanged bush 16 and a surface of the flange 16*b* are both smoothly finished. The number of rows, the interval of rows, and the number of stages (number) in each row of the peripheral-surface hole-shaped reference portions 10 may be other than those described above. A general-purpose flanged bush may be used as the flanged bush 16. Those configurations of the peripheral-surface hole-shaped reference portions 10 are the same in upper-surface hole-shaped reference portions in other embodiments.

[Upper-surface Hole-shaped Reference Portions]

The four upper-surface hole-shaped reference portions 11 (FIG. 4 and FIG. 5) are provided on the upper surface 5 of the master main body 2. In each of those upper-surface hole-shaped reference portions 11, the flanged bush 16 (FIG. 9(*c*)) is inserted into and fixed to an upwardly opened hole (vertical hole) opened perpendicularly to the upper surface 5 of the master main body 2. The number, the interval, and the like of the upper-surface hole-shaped reference portions 11 may also be suitably designed. Those configurations of the upper-surface hole-shaped reference portions 11 are the same in upper-surface hole-shaped reference portions in other embodiments.

In any of these case, the flanged bush 16 is made of a material having a low thermal expansion coefficient such as low thermal expansion cast iron, and the surface of the flange 16*b* and an inner peripheral surface of the through hole 16*c* are mirror-finished with high accuracy. The mirror-finishing work can be performed both before and after each flanged bush 16 is fixed to the master main body 2. When the mirror-finishing work is performed after the fixing, accuracy of a mounting angle and a mounting position with respect to the master main body 2 can be improved. The flanged bush 16 can be fixed to the horizontal hole 15 or the vertical hole by any means, but can be fixed with adhesion by Loctite or other adhesives. Caulking, screwing, and other fixing means can be used as necessary. Those configurations of the flanged bush 16 are the same in flanged bushes in other embodiments.

Fourth Embodiment of Inspection Master

Figure 6:
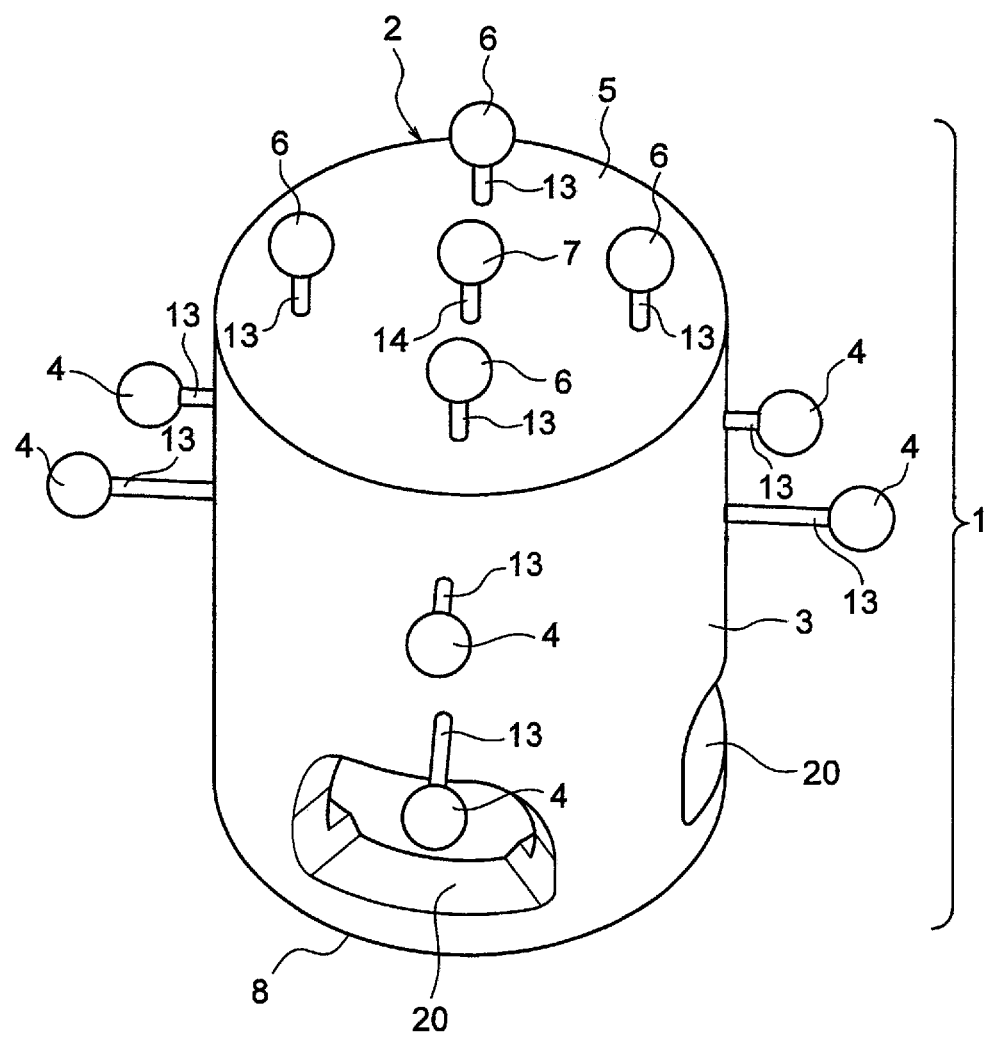
FIG. 6 is a perspective view of an inspection master of the present invention when the peripheral-surface spherical reference portions are provided in four rows on the peripheral surface of the master main body, and upper-surface spherical reference portions are provided on the upper surface.

An inspection master 1 of FIG. 6 is basically the same as the inspection master of FIG. 1(*a*), and is different in that the upper reference ball 7 is provided at the central portion of the upper surface 5 of the master main body 2, four upper-surface spherical reference portions 6 are provided around the upper reference ball 7 at equal intervals, and the peripheral-surface spherical reference portions 4 are provided in four rows at equal intervals in the circumferential direction of the peripheral surface 3 of the master main body 2. The upper-surface spherical reference portion 6 is a spherical body provided in such a manner as to protrude on the upper surface 5, is provided in such a manner as to protrude perpendicularly to and directly upward from the upper surface 5 through intermediation of the connecting shaft 13, and is away from the upper surface 5. Also a diameter and a protruding length of this spherical body are designed such that measurement can easily be performed. A material to be used is less liable to be chipped and cracked and is less liable to be expanded, contracted, and deformed by temperature. The peripheral-surface spherical reference portions 4 are the same as those of FIG. 1(*a*), and the number of rows, the interval of rows, and the number in each row may also be suitably designed.

Fifth Embodiment of Inspection Master

Figure 7:
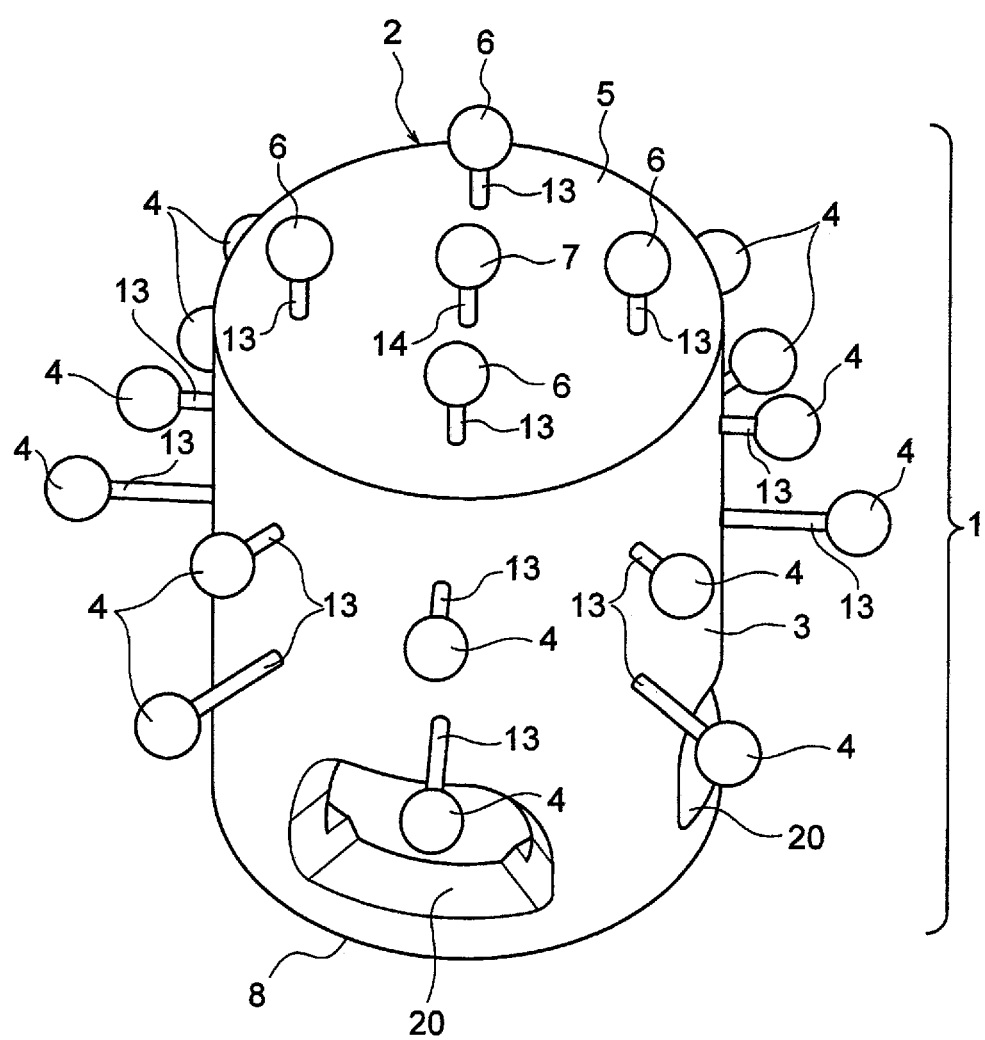
FIG. 7 is a perspective view of an inspection master of the present invention when the peripheral-surface spherical reference portions are provided in eight rows on the peripheral surface of the master main body, and the upper-surface spherical reference portions are provided on the upper surface.

An inspection master 1 of FIG. 7 is basically the same as the inspection master of FIG. 6, and is different in that the peripheral-surface spherical reference portions 4 are provided in eight rows at equal intervals on the peripheral surface of the master main body 2.

Sixth Embodiment of Inspection Master

Figure 8:
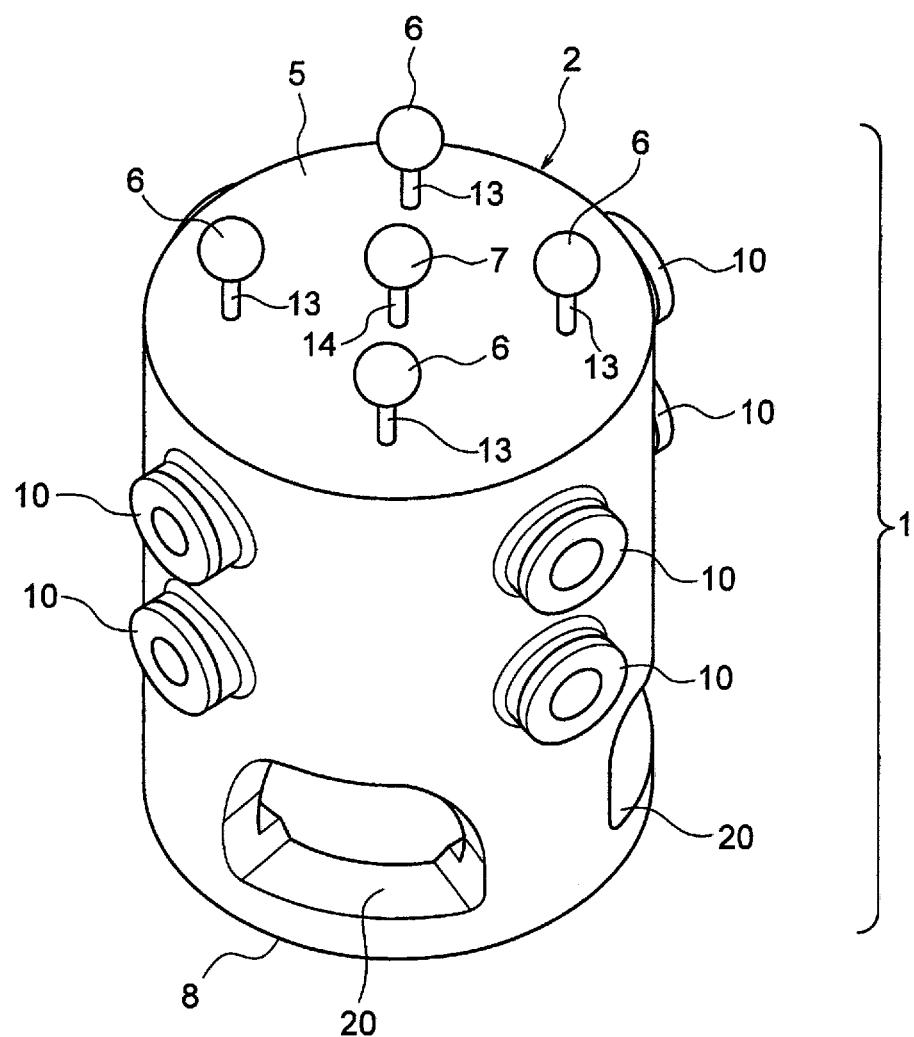
FIG. 8 is a perspective view of an inspection master of the present invention when the peripheral-surface hole-shaped reference portions are provided on the peripheral surface of the master main body, and the upper-surface spherical reference portions are provided on the upper surface.

An inspection master 1 of FIG. 8 and FIG. 9(*a*) is basically the same as the inspection master of FIG. 6, and is different in that the peripheral-surface hole-shaped reference portions 10 are provided in four rows at equal intervals on the peripheral surface of the master main body 2 at the portions of the peripheral-surface spherical reference portions 4.

Seventh Embodiment of Inspection Master

Figure 10:
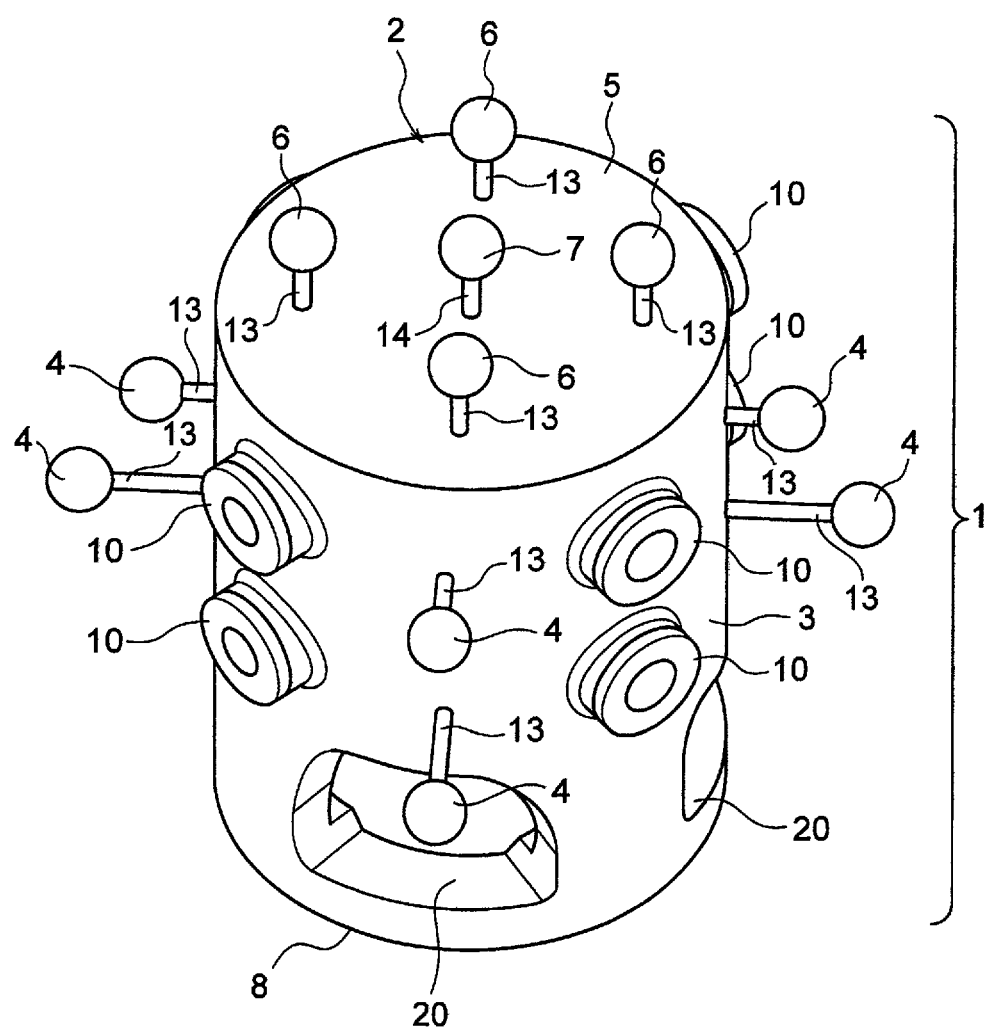
FIG. 10 is a perspective view of an inspection master of the present invention when the peripheral-surface spherical reference portions and the peripheral-surface hole-shaped reference portions are provided on the peripheral surface of the master main body, and the upper-surface spherical reference portions are provided on the upper surface.

An inspection master 1 of FIG. 10 is basically the same as the inspection master of FIG. 8, and is different in that the peripheral-surface spherical reference portions 4 are provided between the peripheral-surface hole-shaped reference portions 10 of the inspection master 1 of FIG. 8.

Usage Example 1

When inspection for a contact type three-dimensional measuring machine is to be performed with use of the inspection master 1 of the present invention, similarly to the related-art three-dimensional measurement, the inspection master 1 of the present invention is set on the holder of the table of the measurement machine, and a probe of the contact type three-dimensional measuring machine is moved in three-axis directions of X, Y, and Z so as to be brought into contact with the peripheral-surface hole-shaped reference portions 10 and the upper-surface hole-shaped reference portions 11 of the inspection master 1.

Usage Example 2

Figure 11:
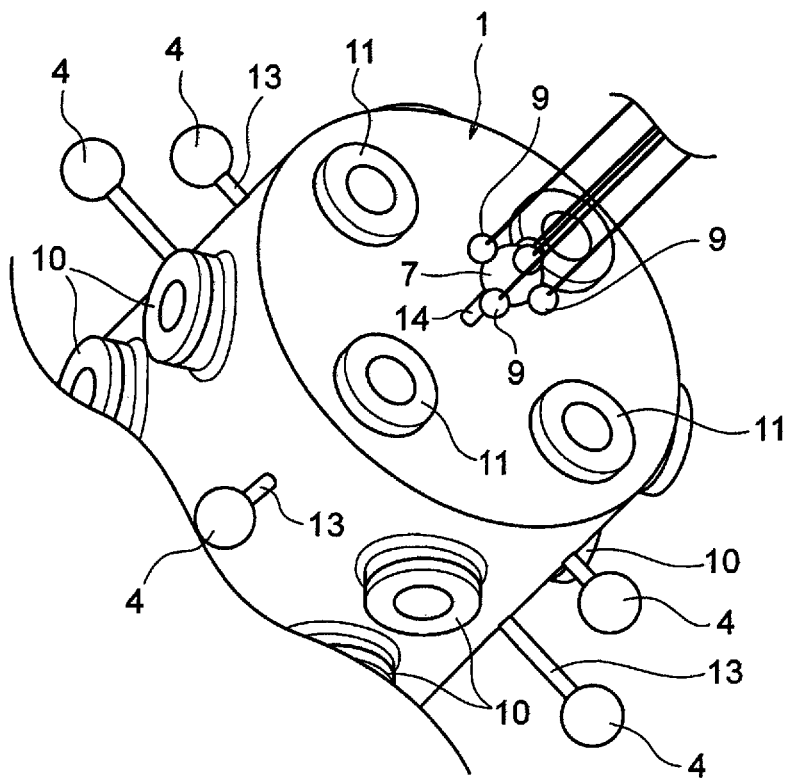
FIG. 11(a) is an explanatory perspective view for illustrating a central coordinate measuring method for an upper reference ball in the inspection master of the present invention.
FIG. 11(b) is an explanatory side view for illustrating the measuring method.
FIG. 11(c) is an explanatory plan view for illustrating the measuring method.
Figure 11:
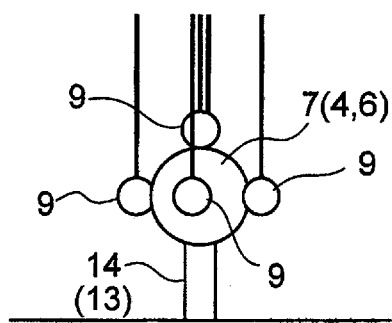
Figure 11:
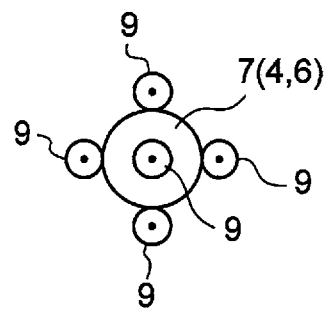
Figure 12:
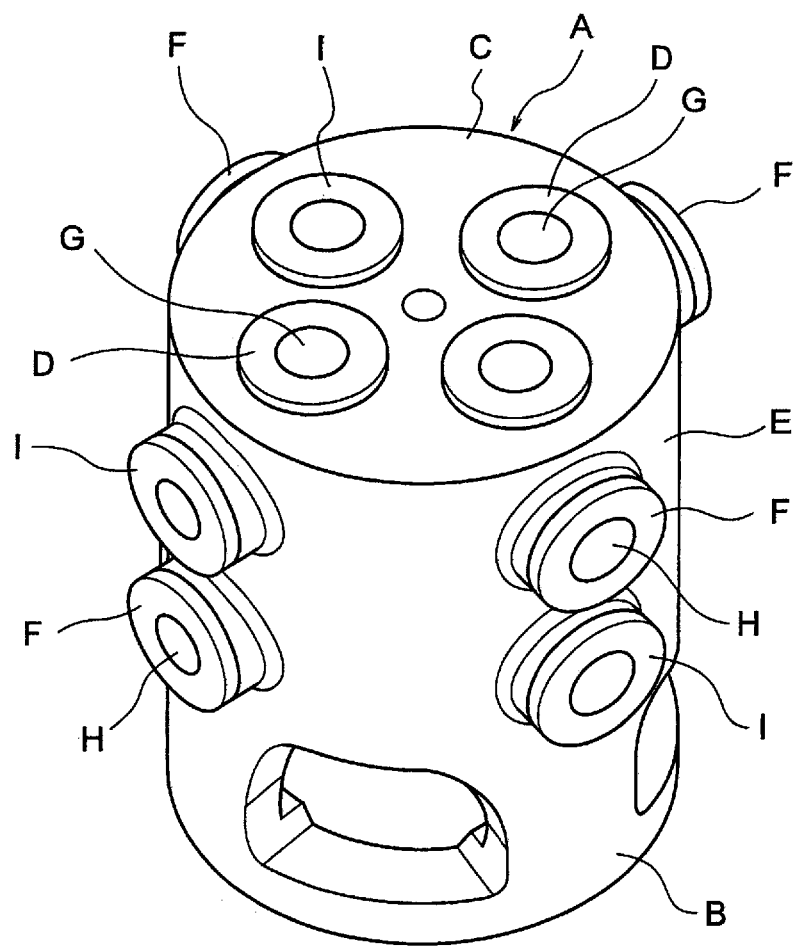
FIG. 12 is an explanatory view of an inspection master previously developed by the applicant of the subject application.
Figure 13:
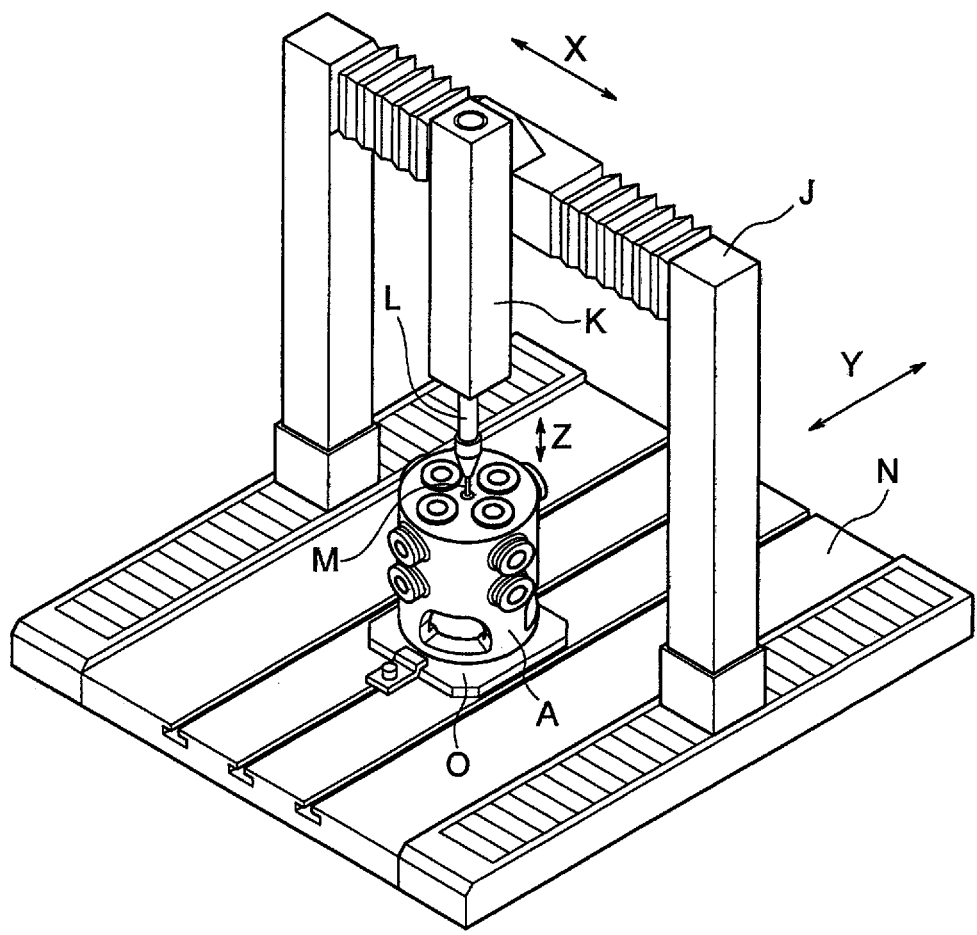
FIG. 13 is an explanatory view for illustrating a case of measuring a contact type three-dimensional measuring machine of a gantry type with use of the inspection master of FIG. 12.

When five-axis inspection is to be performed on the five-axis processing machine with use of the inspection master 1 of the present invention, for example, a measurement head and the spherical measurement probes 9 (FIG. 11(*a*)) are set in place of a machining tool of the five-axis processing machine, and the inspection master 1 of the present invention is set on the table that can rotate or turn or can both rotate and turn. Under this state, the measurement probes 9 are moved in the three-axis directions of X, Y, and Z to be brought into contact with each of the peripheral-surface hole-shaped reference portions 10 or the upper-surface hole-shaped reference portions 11, thereby performing three-dimensional measurement. Further, the table is rotated or turned, or rotated and turned to allow the inspection master 1 set on the holder to incline with respect to the measurement probes 9 (FIG. 11(*a*)).

Under the inclined state, the measurement probes 9 are brought into contact with an outer peripheral surface of each of the spherical bodies of the peripheral-surface spherical reference portions 4, the upper-surface spherical reference portions 6, and the upper reference ball 7 of the inspection master 1 of the present invention, and measurement of the central coordinate of each of the contacted spherical bodies (five-axis measurement in total including the three-axis measurement) is performed. Those measured values (actual measured values) are compared with reference values in which metric traceability is confirmed to check an error between the actual measured values and the reference values and check straightness of each axial direction in which the measurement probes 9 move, squareness between the axes, a display error in each axial direction, and an inter-hole distance. In this manner, evaluation of the measurement machine itself can be performed. When there is an error, the measurement machine or the five-axis processing machine can be adjusted so that the error is eliminated.

In the five-axis measurement, the inspection master 1 is inclined, and hence it is required to check the inclination angle. In this case, the inclination angle can be checked with use of the upper reference ball 7. As an example of the checking method, as illustrated in FIG. 11(*a*) to FIG. 11(*c*), outer peripheral surfaces (top portions) of the spherical measurement probes 9 are brought into contact with the upper reference ball 7 at five portions in total, specifically, top portions (four positions at front, rear, left, and right) and an upper top portion on the outer peripheral surface of the upper reference ball 7 to obtain a central coordinate of the upper reference ball 7. The coordinate value is compared with a reference coordinate value to obtain an inclination of the inspection master 1 based on a difference between both the coordinates. The reference coordinate value can be a central coordinate of the upper reference ball 7 when the upper surface of the inspection master 1 placed on the table is horizontal. When the reference coordinate value is to be obtained in advance, similarly to the case described above, the outer peripheral surfaces (top portions) of the spherical measurement probes 9 are brought into contact with the upper reference ball 7 at five portions in total, specifically, the top portions at front, rear, left, and right positions and the upper top portion on the outer peripheral surface of the upper reference ball 7 to obtain a central coordinate of the upper reference ball 7. When an inclination angle of the peripheral-surface spherical reference portion 4 is, for example, 45°, it is checked whether or not the inspection master 1 is inclined exactly at 45°, and the table can be rotated or turned to adjust the inspection master 1 to an angle of 45° exactly. In the present invention, the inclination of the inspection master 1 is adjusted to a predetermined angle in advance, and the spherical measurement probes 9 are brought into contact with each of the peripheral-surface spherical reference portions 4 to measure the central coordinate, thereby enabling accurate five-axis measurement. Accurate five-axis measurement is enabled also when the spherical measurement probes 9 are brought into contact with the outer peripheral surface of the upper reference ball 7 similarly to the case described above to measure the central coordinate thereof. The method for obtaining the inclination angle may be other methods. The measurement probes 9 may be articulated arm probes or probes having other configurations.

Other Embodiment

The above-mentioned embodiments are each an example of the inspection master 1 of the present invention. The inspection master 1 of the present invention is not limited to the above-mentioned embodiments, and other configurations, materials, and the like can be adopted as long as the problem of the present invention can be solved. The master main body 2 may not be a cylindrical shape, but may be a rectangular shape, a polygonal box shape, or any other three-dimensional shape.

REFERENCE SIGNS LIST

1 inspection master
2 master main body
3 peripheral surface (of master main body)
4 peripheral-surface spherical reference portion
5 upper surface (of master main body)
6 upper-surface spherical reference portion
7 upper reference ball
8 bottom surface
9 measurement probe
10 peripheral-surface hole-shaped reference portion
11 upper-surface hole-shaped reference portion
13 connecting shaft
14 connecting shaft (of upper reference ball)
15 laterally opened hole
16 flanged bush
16*a* cylindrical portion (of flanged bush)
16*b* flange (of flanged bush)
16*c* through hole (of flanged bush)
20 opening portion
A inspection master
B master main body
C upper surface (of master main body)
D upper-surface measurement portion
E peripheral surface (of master main body)
F peripheral-surface measurement portion
G reference hole (vertical hole)
H reference hole (lateral hole)
I measurement reference surface
J gantry-type movable frame
K head portion
L elevation shaft
M probe
N measurement table
O holder

The invention claimed is:

1. An inspection master, comprising:
a master main body having a hollow cylindrical shape and including a peripheral surface and an upper surface;
peripheral-surface spherical reference portions that protrude laterally on the peripheral surface of the master main body; and
an upper reference ball for detection of an inclination angle of the master main body, the upper reference ball protruding upward on the upper surface, wherein
the peripheral-surface spherical reference portions are in two or more rows on the peripheral surface in a circumferential direction of the peripheral surface,
the peripheral-surface spherical portions of each of the rows includes two or more peripheral-surface spherical portions arranged in an up-and-down direction of the peripheral surface of the master main body, and each of the peripheral-surface spherical reference portions includes a spherical body at a tip of a connecting shaft protruding laterally from the peripheral surface.

2. The inspection master according to claim 1, wherein the peripheral-surface spherical reference portion of each of the rows includes two or more peripheral-surface spherical reference portions arranged in an up-and-down direction of the peripheral surface, and the peripheral-surface spherical reference portion on a lower side has a longer protruding length in a lateral direction than a protruding length of the peripheral-surface spherical reference portion on an upper side.

3. The inspection master according to claim 1, further comprising peripheral-surface hole-shaped reference portions, which are oriented laterally in two or more rows on the peripheral surface of the master main body, wherein
the peripheral-surface hole-shaped reference portions of each of the rows are between two or more rows of the peripheral-surface spherical reference portions, and
each of the peripheral-surface hole-shaped reference portions is a hole laterally opened to the peripheral surface.

4. The inspection master according to claim 1, further comprising two or more upper-surface hole-shaped reference portions on the upper surface of the master main body,
wherein each of the upper-surface hole-shaped reference portions is a hole vertically opened to the upper surface.

5. An inspection master, comprising:
a master main body having a hollow cylindrical shape and including a peripheral surface and an upper surface;
peripheral-surface spherical reference portions protruding laterally on the peripheral surface of the master main body;
an upper reference ball for detection of an inclination angle of the master main body, the upper reference ball protruding upward from the upper surface, wherein
the peripheral-surface spherical reference portions are in two or more rows on the peripheral surface in a circumferential direction of the peripheral surface,
the peripheral-surface spherical portions of each of the rows includes two or more peripheral-surface spherical portions arranged in an up-and-down direction of the peripheral surface of the master main body, and
each of the peripheral-surface spherical reference portions includes a spherical body at a tip of a connecting shaft protruding laterally from the peripheral surface; and
upper-surface spherical reference portions that protrude upward at one or two or more portions of the upper surface on an outer side with respect to the upper reference ball,
wherein each of the upper-surface spherical reference portions includes a spherical body at a tip of a connecting shaft protruding upward from the upper surface.

6. The inspection master according to claim 5, further comprising peripheral-surface hole-shaped reference portions, which are oriented laterally in two or more rows on the peripheral surface of the master main body, wherein
the peripheral-surface hole-shaped reference portions of each of the rows are between two or more rows of the peripheral-surface spherical reference portions, and
each of the peripheral-surface hole-shaped reference portions is a hole laterally opened to the peripheral surface.

7. The inspection master according to claim 5, further comprising two or more upper-surface hole-shaped reference portions on the upper surface of the master main body,
wherein each of the upper-surface hole-shaped reference portions is a hole vertically opened to the upper surface.

* * * * *